Figure 1:
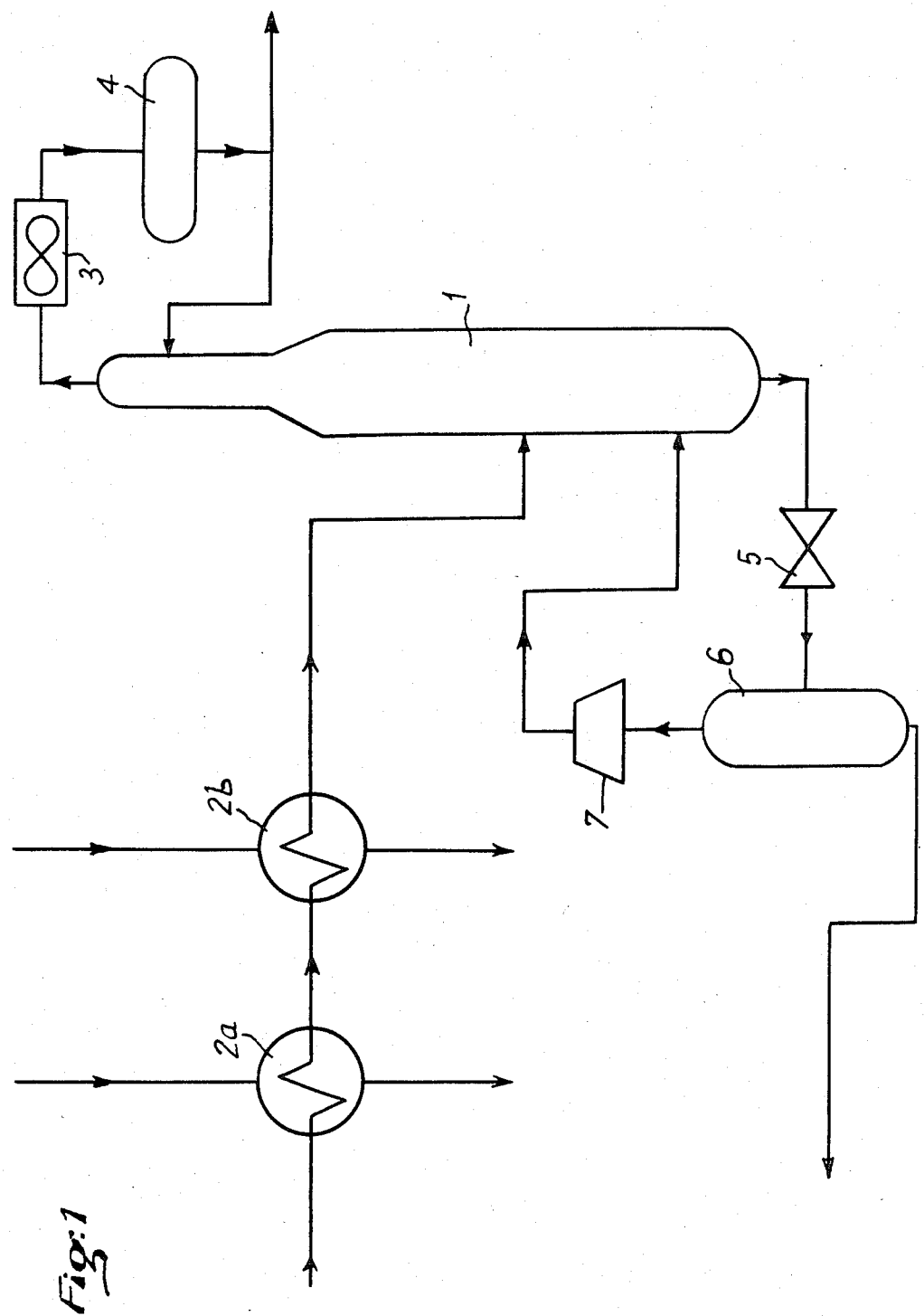

United States Patent [19]

Gourlia et al.

[11] Patent Number: 4,525,244
[45] Date of Patent: Jun. 25, 1985

[54] VAPOR RECOMPRESSION REBOILING PROCESS

[75] Inventors: Jean-Paul Gourlia; Philippe Jacob, both of Lyons; Robert Jamen, Irigny, all of France

[73] Assignee: Elf France, France

[21] Appl. No.: 444,511

[22] Filed: Nov. 24, 1982

[30] Foreign Application Priority Data

Dec. 4, 1981 [FR] France .................. 81 22742

[51] Int. Cl.³ .............................................. B01D 3/02
[52] U.S. Cl. ...................................... 203/26; 159/24.2
[58] Field of Search ............... 203/24, 26, DIG. 4, 203/21, 22, 25; 202/233–235, 182; 159/24 B

[56] References Cited

U.S. PATENT DOCUMENTS 2,315,843 4/1943 Drennan et al. .................. 196/11

FOREIGN PATENT DOCUMENTS 2074035 10/1981 United Kingdom .

OTHER PUBLICATIONS

Electricite et Economies d'Energie, vol. 89, No. 3, Mar. '80, L. Muller, pp. 219–224.

Primary Examiner—Frank Sever
Attorney, Agent, or Firm—Poms, Smith, Lande & Rose

[57] ABSTRACT

This invention relates to distillation in pressurized columns and provides a process for reboiling such columns. The column 1 working at a pressure of 11 bar is fed with a mixture of hydrocarbons preheated in exchangers 2a and 2b to about 130° C. A part of the bottom is withdrawn, then expanded by means of an expansion valve 5 to 2.5 bar in an expansion balloon flask 6 where the phases are separated. The vapor phase is compressed in a compressor 7 to the pressure of the column and reinjected at the bottom of the column, whereas the liquid phase is removed.

With the process, energy can be saved in pressurized distillation columns, for example in petrol stabilization columns.

5 Claims, 2 Drawing Figures

VAPOR RECOMPRESSION REBOILING PROCESS

The present invention relates to a reboiling process in a distillation column operating under pressure.

In known reboiling processes, a part of the product is withdrawn from the bottom of the column, it is heated by indirect heat exchange with a fluid at a high thermal level, then the vapour and liquid phases are separated and a vapour phase is reinjected into the column. The high thermal level fluid used is either high pressure steam, or a hot fluid coming from another refining unit. In both cases, it is a question of a fluid whose use for reboiling causes considerable dissipation from the energy point of view and poses the problem of economy of energy.

The invention has as object to remove this disadvantage by doing without a source as precious as a high thermal level fluid. It is characterized in that at least a part of the product is drawn from the bottom of the distillation column, it is expanded by means of an expansion valve and liquid and vapour phases are separated in an expansion tank, then the vapour phase is recompressed in a compressor to the pressre reigning at the bottom of the column and a compressed product is reinjected into the column.

It is already known, for ensuring reboiling in distillation columns, to compress the products coming from the head of the distillation column in the vapour state. However, the application of such a technique comes up against constraints due to the relative thermal levels of the products at the head and at the bottom of the column.

In fact, the higher the difference between the thermal levels of these products, the more it is necessary, when the head products are used for reboiling of the column, to apply thereto a high compression ratio. We then jump very rapidly up against an economic obstacle and even sometimes a technical impossibility relative to the critical temperature of the fluid. In fact, this technique can only be used for small temperature variations of the order of 30° C., which limits the application thereof to some separations, such for example as the separation of isomers. The process of the invention may be likened to the heat pump technique. Since the expansion in the valve is isenthalpic, the amount of latent heat required for vapourizing the vapour phase obtained in the expansion balloon flask is supplied by the liquid phase in the form of perceptible heat. Thus, the temperature of the liquid phase is much lower than the temperature of the product at the bottom of the tower before the expansion valve. The residue, that is to say, the bottom product, is then a low thermal level heat source which may be called the cold source. Furthermore, the recompressed vapour phase from the expansion balloon flask exchanges heat and material with the bottom of the tower. It supplies the energy required for separating light and heavy products in the column. The bottom of the tower may be called the hot source, for it receives heat.

In the process of the invention, the heat has been taken from a cold source, which is the residue, whose heat level has been raised by means of a compressor, whereas an amount of high thermal level heat has been supplied to a heat source which is at the bottom of the tower. The conventional reboiler providing an amount of heat Q has been replaced by the expansion valve and expansion balloon flask assembly and by the compressor, supplying work W. The amount of heat supplied by the residue, so the cold source, is $Q-W$. The performance coefficient is defined by the relationship:

$$COP = Q/W.$$

The reboiling process of the invention, easily applicable to distillation columns operating at high pressures, may also be applied to any distillation tower by providing, if need be, adequate systems lowering the pressure in the expansion balloon flask. The pressure reigning in the balloon must be such that the vapourized fraction supplies the amount of vapour required for ensuring reboiling and, consequently, correct operation of the column. The work of the compressor is determined by the compressor ratio and by the amount of vapour to be compressed.

During real operation of the column, the principal parameters, such as the supply flow rate and the fractionation, develop. These variations result in a greater or smaller demand for reboiling heat, which may be satisfied in the following way. If the demand increases, it is sufficient to lower the pressure in the expansion balloon flask by closing the expansion valve a little more. Vapourization is then higher, the temperature of the balloon flask is lowered and the compressor supplies a greater amount of work due to the increase in the compression ratio and the amount of vapour to be recompressed. The reboiling heat is increased by increasing the work of the compressor and the amount of additional perceptible heat yielded up by the residue which is colder on leaving the balloon flask.

In the opposite case, an increase of pressure in the expansion baloon flask causes a reduction of the vapourized fraction and so of the reboiling heat.

Another means for regulating the process consists in variable addition of heat to the expansion balloon flask, which then maintains a constant pressure. If, at constant pressure, the expansion balloon flask is heated, the vapourization increases, the compressor compresses a greater amount of vapour and supplies a larger quantity of reboiling heat. Conversely, cooling of the balloon flask causes reduction in the amount of vapour and consequently a reduction of the reboiling heat. Insofar as the integration of the thermal cycle of the invention in the total energy consumption of the installation is concerned, it should be noted that, when reboiling is effected according to the conventional heat exchange process with the bottom at a high thermal level, the liquid residue resulting from the exchange is at a sufficiently high temperature to be able to serve for example for preheating the fluid supplying the column. By doing without a high thermal level fluid for reboiling, it is necessary to carry out said preheating with an auxiliary fluid. The advantage of the invention is also apparent, if we compare the criteria of the choice of fluid serving for reboiling in accordance with the conventional process and those for the fluid for preheating the supply fluid of the column. Since the energy of the first one must be used in the form of latent reboiling heat, it must necessarily be at a higher level than that of the second which simply ensures the exchange of perceptible heat for preheating.

Other features of the process of the invention will appear from the following examples of one mode of application to a petrol stabilizing column.

Figure 2:
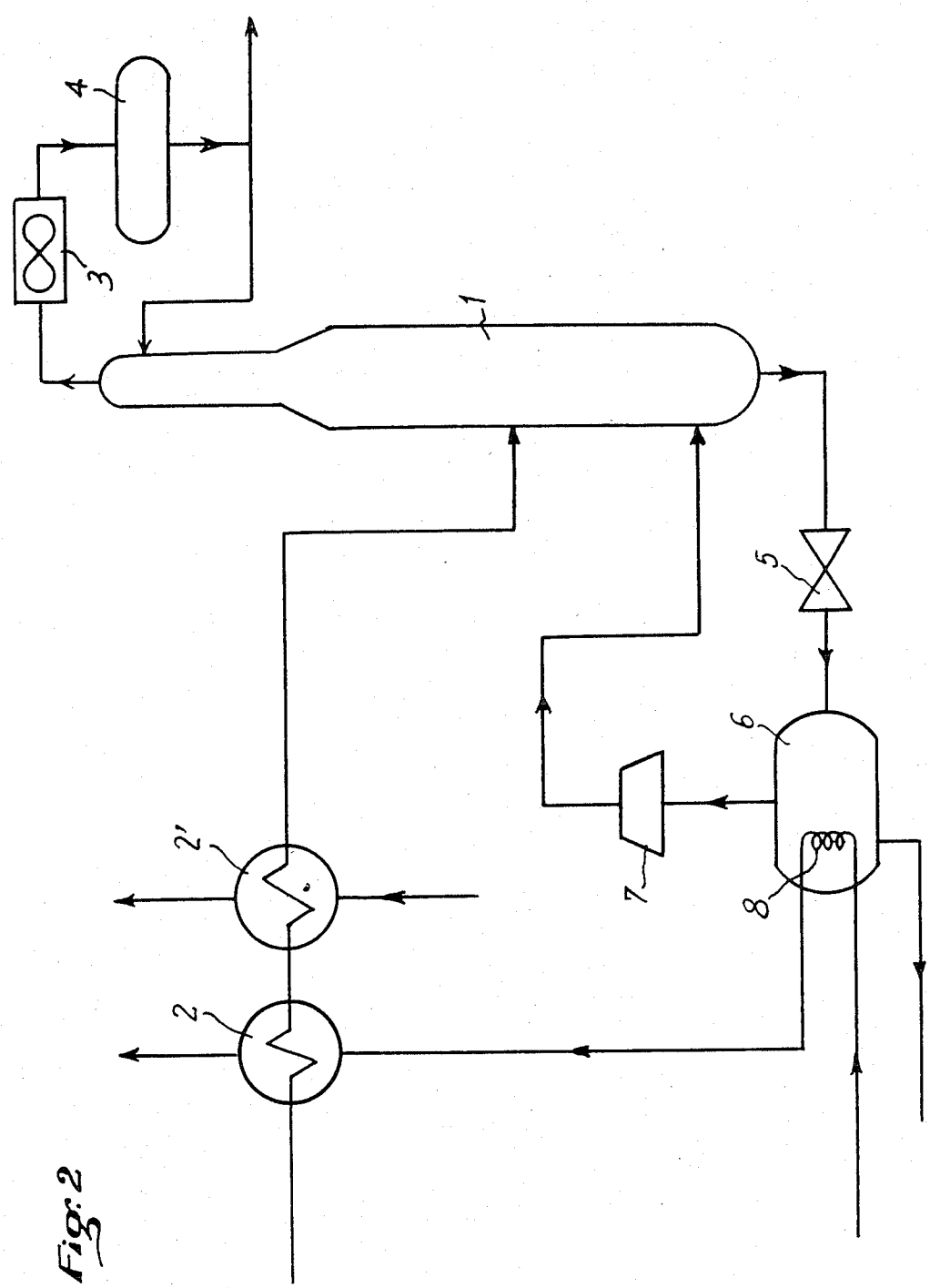

In the accompanying drawings,

FIG. 1 shows a general diagram of an installation using the process of the invention, and FIG. 2 a variation of the preceding diagram.

The installations shown in FIGS. 1 and 2 comprise a distillation column 1 for stabilizing petrols operating at a pressure of about 11 bar and which is fed in the middle with a mixture of light hydrocarbons, previously preheated by indirect exchange in exchangers 2, 2', 2a and 2b to about 130° C. The vapours coming from the head of the column are cooled in cooler 3, the condensate having the composition of a light petroleum gas is collected in a head flask 4, then partially reintroduced as reflux into the column and partly discharged.

The bottom part of the column is withdrawn from the bottom of the column and expanded by means of an expansion valve 5 in an expansion balloon 6, where the vapour phase and the liquid phase are separated. This latter is withdrawn from the bottom of the balloon flask, whereas the vapour phase is compressed in a compressor 7 to the pressure of the column and the compressed phase is reinjected into the bottom of the column 1. Through the compression, the temperature of the reinjected phase rises to about 170° C.

In the case of the diagram of FIG. 1, the bottom of the column withdrawn has been expanded to about 2.5 bar and the compression of the vapour phase in compressor 7 has required work of about 1200 kW. By lowering the pressure in the flask to 2.5 bar, the heat added to the column has been sufficient without requiring an addition of heat to the expanded vapour phase before compression thereof. However, the liquid phase separated in the flask was at the temperature of about 80° C., too low for preheating the supply product. This preheating was achieved in exchangers 2a and 2b by means of an auxiliary fluid, such as a light gas oil at a thermal level which is not very high, but sufficient for the reasons outlined above.

In the case of diagram of FIG. 2, the bottom of the column has been expanded to about 4 bar with consequently the formation of a liquid phase having a temperature of about 100° C.

A heat exchanger 8 is mounted in flask 6 and supplied with light gas oil at about 145° C. for adding heat to the expansion flask so as to raise the temperature thereof. The compression of the vapour has required work of the order of 800 kW and the temperature after compression rose to about 170° C. The gas oil having served for the heat exchange in exchanger 8 is fed to exchanger 2, where it serves for preheating the product supplying the column. The preheating of the supply product has been completed by indirect exchange with a low thermal level auxiliary fluid in exchanger 2'.

With the process of the invention, considerable saving of energy may be achieved. In the case of the operation of the petrol stabilization column, a high thermal level fluid, such as the lower circulating reflux of the atmospheric distillation tower (RCI) at 332° C., may be replaced by a light gas oil at about 150° C.

It also offers great flexibility and allows the amount of heat supplied to the column to be adjusted depending on the demand by relatively simple means, such as adjusting the expansion pressure and/or the temperature of the vapour produced during expansion.

We claim:

1. A process for reboiling a distillation column operating under pressure in which the products are normally discharged at the top of the column and in which a part of the bottom product is withdrawn from the bottom of the column and provides a low thermal level heat source, characterized in the steps of:
   expanding the withdrawn bottom product as a whole in an expansion balloon flask;
   withdrawing the liquid fraction resulting from the expansion of the bottom product;
   compressing only the vapor fraction of the bottom product from the resulting expansion and;
   then reinjecting the compressed vapor fraction into the column to provide a selected reboiling heat.

2. The process according to claim 1 including the step of:
   adjusting the amount of reboiling heat by regulating the pressure under which the bottom product taken from the column is expanded.

3. The process according to claim 1, including the step of:
   adjusting the amount of boiling heat by regulating the temperature in the expansion balloon flask by means of indirect heat exchange.

4. A process for reboiling a petrol stabilization column operating at a pressure of about 11 bar according to claim 1 including the steps of:
   expanding the withdrawn bottom product to a pressure of about 4 bar,
   heating the vapors thus produced to about 102° C. by means of indirect heat exchange with an auxiliary fluid at a thermal level which is not very high and compressing the produced vapors to about 11 bar, the auxiliary fluid serving, after exchange, for preheating the product supplying the column.

5. A process for reboiling the bottom product in a distillation column, said process comprising the steps of:
   withdrawing a portion of the said bottom product from the bottom of said distillation column:
   expanding at pressure above atmospheric said withdrawn portion of said bottom product to vaporize a portion of any volatile component of said withdrawn portion of said bottom product;
   compressing said vaporized volatile component to raise the heat level of said vaporized volatile component;
   the step of compressing said vaporized volatile component being determined by the expansion ratio applied to the withdrawn bottom product and varying between 2 and 4 and by the amount of vapor to be compressed; and
   then directly reinjecting said compressed vaporized volatile component into the bottom of said distillation column, whereby said reinjected compressed vaporizer volatile component will supply heat to reboil said bottom product in said distillation column.

* * * * *

UNITED STATES PATENT AND TRADEMARK OFFICE
CERTIFICATE OF CORRECTION

PATENT NO. : 4,525,244

DATED : June 25, 1985

INVENTOR(S) : Jean-Paul Gourlia; Philippe B. Jacob; and Robert Jamen

It is certified that error appears in the above-identified patent and that said Letters Patent are hereby corrected as shown below:

Claim 1, line 13 after "then" insert --directly--.

Signed and Sealed this

Twenty-second Day of October 1985

[SEAL]

Attest:

DONALD J. QUIGG

Attesting Officer

Commissioner of Patents and Trademarks—Designate